United States Patent [19]

Rickli et al.

[11] Patent Number: 5,481,588
[45] Date of Patent: Jan. 2, 1996

[54] TEST ARRANGEMENTS FOR RADIO TELEPHONE SYSTEMS

[75] Inventors: Hansueli Rickli, Uerklisweg; Daniel Wetter, Burenweg, both of Switzerland

[73] Assignee: Alcatel N.V., Rijswijk, Netherlands

[21] Appl. No.: 223,158

[22] Filed: Apr. 5, 1994

[30] Foreign Application Priority Data

Apr. 6, 1993 [CH] Switzerland .............................. 1055/93

[51] Int. Cl.$^6$ ............................ H04M 1/24; H04M 11/00
[52] U.S. Cl. .................. 379/32; 379/24; 379/58; 455/67.1
[58] Field of Search .................................. 379/32, 59, 58, 379/60, 24; 455/54.1, 33.1, 67.1, 115

[56] References Cited

U.S. PATENT DOCUMENTS

| | | | |
|---|---|---|---|
| 4,311,882 | 1/1982 | Johner et al. | 379/10 |
| 4,977,399 | 12/1990 | Price et al. | 455/38.5 |
| 5,095,500 | 3/1992 | Tayloe et al. | 379/32 |

FOREIGN PATENT DOCUMENTS

| | | |
|---|---|---|
| 0431956 | 6/1991 | European Pat. Off. . |
| 646294 | 11/1984 | Switzerland . |
| 9315569 | 8/1993 | WIPO . |

OTHER PUBLICATIONS

"Der Schlüssel zum optimalen Netz" Funkschau I Spezial Bd. 64, Nr. 6, Mar. 6, 1992, Munchen, DE, pp. 32–36.
"Cellular Mobile Radio System/Alcatel 900 Network Planning" Alcatel SEL A.G. brochure, Ed. 2, Feb. 1992, pp. 1–3 and 56–60.
Huff et al, "The Chicago Developmental Cellular System", 28th IEE Vehichular Technology Conference, Mar. 22–24, 1978, 86–72.

*Primary Examiner*—Stephen Chin
*Assistant Examiner*—Kevin Kim
*Attorney, Agent, or Firm*—Ware, Fressola, Van Der Sluys & Adolphson

[57] ABSTRACT

The relevant data on the quality of service at different positions within a coverage area which is to be monitored of a mobile radio installation are ascertained by test mobile remote units (16) that are preferably mounted on vehicles which travel regularly on random routes (20) in the area. The test mobile remote units (16) acquire and store the call identification and connection parameters and the time and position data. Evaluation is effected via a test control unit (17), which is connected to a mobile switching center (15).

28 Claims, 2 Drawing Sheets

TEST ARRANGEMENTS FOR RADIO TELEPHONE SYSTEMS

TECHNICAL FIELD

The present invention relates to test arrangements for radio telephone systems and concerns a method and a device to determine the quality of service in a mobile radio installation.

BACKGROUND OF THE INVENTION

Mobile radio installations for telephone traffic are characterized by transceiver base stations distributed over a given geographical territory and connected together by permanently established communication arrangements. When a call is made, temporary communication is established between these base stations and the mobile transceiver stations of the subscribers. In an extended version, these arrangements are not only used for speech communication but also for information transmission in general, in particular also for the transmission of data of any required kind. The requisite number of base stations and their location depend on the topographical features of the territory within which connections with subscribers are to be possible and on the number of such connections which can be established simultaneously. That being so, the criteria for the quality of service change constantly: in the short-term, as a result of variations in the volume of traffic and the change of location, in the medium-term through alterations to the landscape (buildings) and in the long-term through changes to the installation itself.

Modern installations cover extensive geographical territories and are run by many different undertakings—one example being the GSM or global European, digital, cellular mobile radio system. The operator of a mobile radio system requires dependable data on the service quality in his coverage area. Obtaining such data is both costly and time-consuming, as the quality of service depends on the particular location and traffic must be possible throughout the area which is covered.

CH-A-646294 describes a method and a device for testing traffic routes in a telecommunications network with permanent lines, by means of which the service quality of said network is investigated and can also be monitored, provided that the tests are performed often enough. In this case, a central unit controls a plurality of decentralized units distributed throughout the network by transmitting to the latter all the data necessary for a sequence of test calls via a modem dialling line. Thereafter, the decentralized units make calls automatically and store the test results which are then periodically consulted by the central unit. The traffic route testing permits the establishment of test calls between different points of the network; by doing so, it enables the situation regarding availability for the subscriber to be determined, in other words whether and after how long the subscriber obtains the dialling tone on request, whether and how long after dialling the ringing tone sounds, whether the line attenuation in both transmission devices fall within certain limits, whether the call charging is performed correctly, whether the line is correctly released after the connection has been terminated and so forth.

However, in the present instance of a mobile radio installation, there are no permanent lines to which decentralized units might be connected. In the case of a mobile radio system other parameters are of interest, such as position-dependent fluctuations in the receiving field strength, possible interference caused by more remote transmitters working on the same frequency, the behaviour on transition from one transmitting area to the next and so forth.

The brochure issued by the Alcatel SEL AG company of Stuttgart and entitled "Alcatel 900 Network Planning", Ed. 2, Feb. 1992, describes in its Chapter 3.2 (p 56–60) a system for the measurement and evaluation of radio connections in GSM networks. The system consists essentially of three parts: a measuring facility, to be installed on a vehicle, with a mobile test station which operates in compliance with the GSM recommendations, a conventional mobile telephone, a laptop computer and a positioning system, together with a base station simulator and an evaluation facility for cartographic presentation of the measurement results. The system assists the operator of GSM networks at different phases of development, in particular to determine the sites of the base antennas when the network is first set up. The base station simulator is used solely for that purpose. The mobile test station monitors the receiving field strength, the speech quality, various fault rates and the channel pulse response. It is connected via an RS 232 interface to the computer which controls the station and stores the values measured by it, together with the corresponding position data from the positioning system. The mobile telephone is operated in parallel with the test station. Its purpose is to correlate the subjective impression of speech quality with the fault rates. The stored data are saved onto diskettes for the stationary evaluation facility where they are loaded into the bulk memory of a powerful computer (workstation), processed and displayed together with pre-inputted cartographic information. By means of a colour-marked presentation of the measured values it is possible to visualize directly whether a base station site gives acceptable results.

The system as described is based on the continuous recording of measured values along selected routes. It requires a dedicated workplace in a vehicle and must be manned continuously. It is not able to supply relevant, large-scale data on the service quality of an operational mobile radio installation.

DISCLOSURE OF INVENTION

The aim is therefore to acquire statistically relevant data at reasonable cost on the quality of service in a particular coverage area of a mobile radio installation.

According to the present invention, the quality of service in a mobile radio installation with at least one base transceiver station and a plurality of mobile subscriber sets is ascertained with the aid of at least one test mobile remote unit which is able, among other things, to determine its position and the clock time, and a test control unit which, among other things, is able to determine at least the clock time, and wherein calls are initiated between the test mobile remote unit and the test control unit or between test mobile remote units and the test control unit and wherein call identification and call connection parameters as well as position and clock time data are stored in both the test control unit and the test mobile remote unit and wherein the stored data in the test mobile remote unit is periodically transferred to the test control unit for statistical evaluation and display.

In further accord with the present invention, the test mobile remote unit or units are set up on a vehicle or vehicles for circulating mainly on arbitrary routes at regular intervals.

In still further accord with the present invention, test mobile remote units are set up on a plurality of vehicles for circulating in a particular territory in such a way that they are substantially equally distributed and cover the entire area.

According still further to the present invention, the stored data is transferred between the test mobile remote unit and the test control unit by radio.

Still further in accord with the present invention, calls initiated between the test mobile remote unit and the test control unit are initiated on the basis of positional predeterminations within the test mobile remote unit as a function of the position which has actually been determined.

In still further accord with the present invention, the statistical evaluation is used to adapt the positional predeterminations of the calls.

According still further to the present invention, the call identification and call connection parameters of calls initiated by the test mobile remote unit are periodically transferred along with the calls initiated by the test control unit for evaluation.

In accordance still further to the present invention, as applied to a cellular mobile radio system, parameters specific to cellular mobile radio, in particular, in identification of a base station and any intercellular handover which occurs are also stored.

The solution provides for the use of test mobile remote units which are preprogrammed to make and/or receive calls and in so doing are capable of acquiring and storing the relevant data. The relevant data include information on a call which has been made, interrupted, broken off or not established, a change of cell, a change of frequency, the reception level and so forth and, in particular, the location and clock time which are determined by a navigation unit, preferably a global positioning system. As a test generally extends over more than one single day, the term clock time is generally to be understood as denoting both the date and time of day. The memorized data are transferred at a suitable opportunity to a control unit which evaluates them statistically and displays them in a suitable form. The control unit may be the remote station for calls and will be connected to one of the permanently established transmission arrangements preferably directly to a switching centre of the mobile radio installation. A special advantage of this method resides in the fact that the test unit does not need to be manned during the test drives, and that a valuation of the quality of service is possible for the mobile radio installation alone, independent from the quality of other networks.

The test mobile remote units are preferably mounted on vehicles which regularly drive through the territory that is to be monitored. This approach is based on the notion that the data relevant to an assessment of the quality of the network are primarily those in respect of positions from which calls are frequently made. Areas in which dense call traffic exists are of particular interest for the acquisition of data on the quality of service because the largest number of users are affected there. Vehicles which travel on routes running through such areas are therefore representative of the overall situation.

In a mobile radio installation in which data transmission is possible via a mobile subscriber set, the test values can also be transmitted and the call programs transferred by radio.

In an extended version of the method, the instantaneous position of the test mobile remote unit determines the given call initiation program. This enables, for example, the number of calls to be increased in areas for which insufficient test data is available as yet. In addition, the result of the statistical evaluation can also be used to adjust the predetermination of calls.

The control unit must at the very least have an accurate clock time indication to permit correct evaluation of the acquired data. It will also preferably contain a receiving unit for a global satellite positioning system; this will enable the accuracy of the position determination for the test mobile remote units to be increased.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
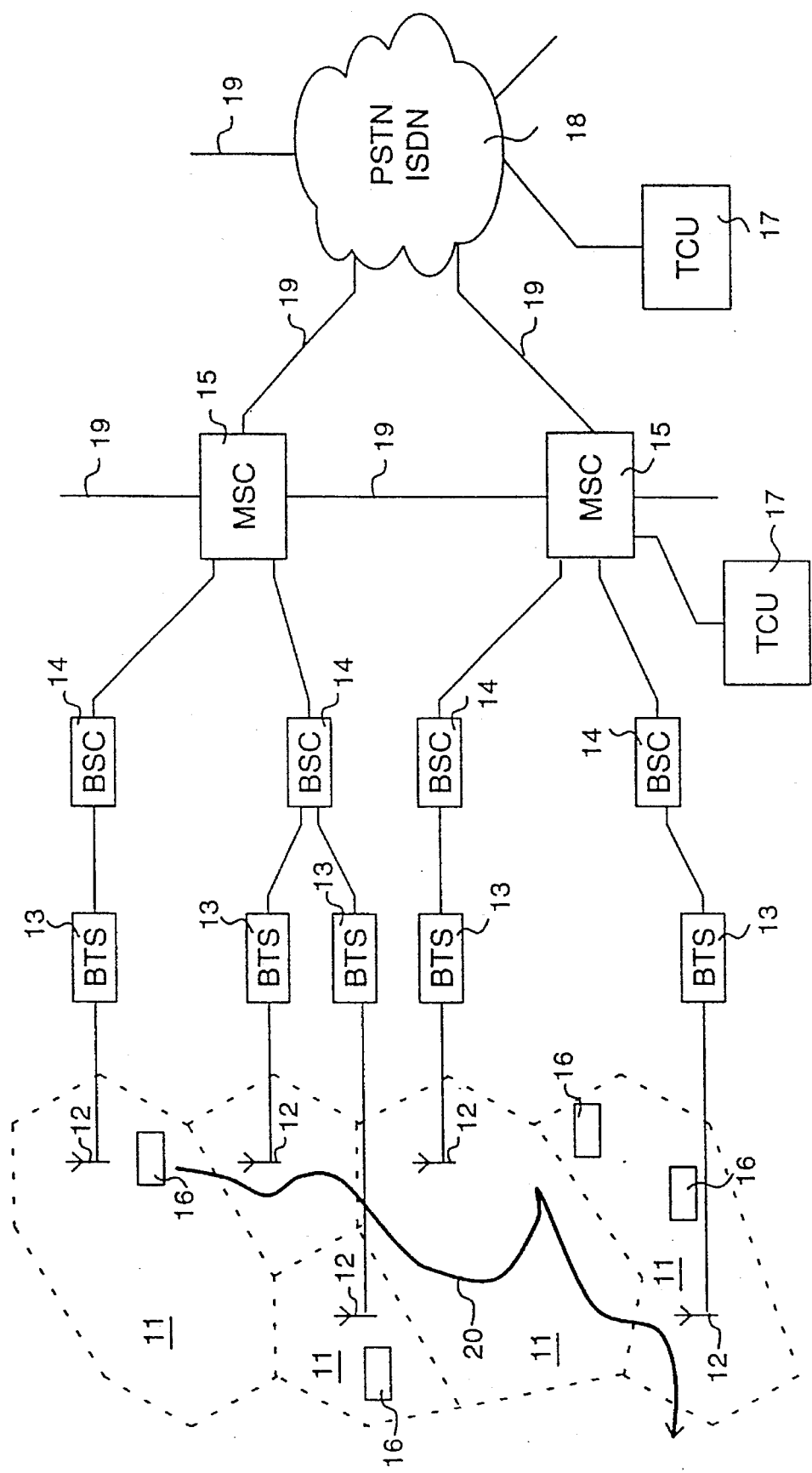
FIG. 1 shows a block sectional view of a mobile radio network, according to the present invention.

FIG. 1 shows a block sectional view of a mobile radio network, according to the invention, for use in the global European, digital, cellular mobile radio system. The use of the invention for the global system for mobile communication, GSM, requires a plurality of base stations distributed over the territory, having one base antenna 12 and one base transceiver unit 13 (BTS) each. The base antennas 12 serve subscribers who are located in their respective geographical area corresponding to a cell 11 at the time when the connection is established. The whole area in which it must be possible to reach the subscriber—this may also include the air space—is covered by a plurality of cells 11. The nature and size of the individual cell 11 is determined firstly by the topographical features (mountains, ravines, houses), and secondly by the anticipated subscriber density in the area concerned; if that density is high, several smaller cells 11 with their base antennas 12 will be needed. The base stations are connected either individually or in small groups via a base station control 14 (BSC) to a mobile switching centre 15 (MSC). Calls from and to the cells 11 which are connected to the same mobile switching centre 15 can be put through directly. The mobile switching centres 15 are networked via permanently established connections 19 either as a separate group or via interfaces with other networks 18 (Public Switched Telephone Network, PSTN; Integrated Services Digital Network, ISDN).

When a mobile subscriber moves from one cell to the next while a connection is established, the connection with the base station in the neighbouring cell is established and the previous connection broken off without his intervention. If the subscriber changes over to a cell which is connected to a different mobile switching centre than the one which he is leaving, the new connection is established via this other switching centre. The mobile radio system keeps an ongoing log of the location of the subscriber in registers (not shown) which are specially created for this purpose.

To determine the position-related quality of service, according to the invention at least one test mobile remote unit 16 is used at a position which changes constantly within the territory to be tested. As a general rule, a plurality of these units will be on the road. The route 20 that may be covered by such a test unit 16 under these conditions is shown in diagrammatic form in FIG. 1. In the example shown, it will be necessary to switch the connection on via the neighbouring mobile switching centre 15. If the test unit leaves the test area which is of interest, a connection can also be established via other centres but further tests may cease. In addition a test control unit 17 is needed; this unit is connected as a stationary subscriber to the mobile switching centre 15. A connection via the other network 18 is likewise possible. The direct connection of the test control unit 17 to the mobile switching centre 15 has, nevertheless, the advantage to autonomously determine the quality of service within the mobile radio installation, consequently independent from the quality of service of the other network 18. Furthermore a plurality of test control units 17 may be in operation simultaneously.

The test is not tied to particular routes. On the contrary, connections are established in a fixed time frame. The exact location of the test unit at a particular point in time is a random factor. However, the connections may also be established on a preprogrammed basis at specified locations. The point in time at which this is done will then be more or less random, but may be an interesting measured value. The evaluation of the large number of calls gives the required basis for the assessment of service quality. The test mobile remote unit 16—in a practical application, several such units will generally be in operation simultaneously—is habitually operated from a vehicle which is selected for the test. Suitable vehicles include in the first instance those operated by courier services, taxis etc. which regularly travel within the area on arbitrary or random routes. Refuse disposal trucks are another suitable category of vehicle as the fleet of such circulating trucks covers the totality of a given territory.

Figure 2:
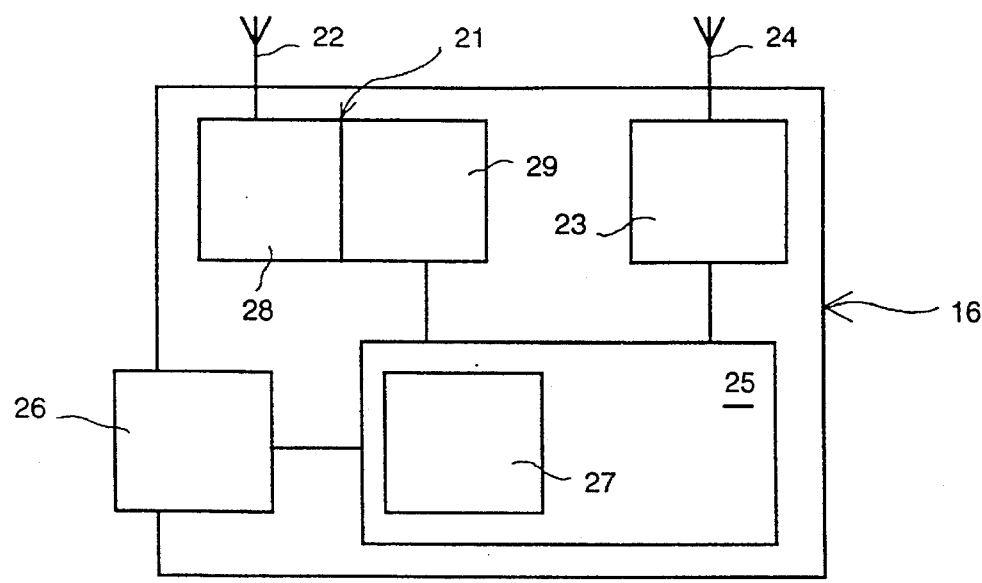
FIG. 2 a block circuit diagram of a test mobile remote unit, according to the present invention, and FIG. 3 a block circuit diagram of a control-unit, according to the present invention.

FIG. 2 is a block circuit diagram showing the main components of a test mobile remote unit 16 and the relationship between them. These components are a mobile test subset 21, a navigation unit 23, a control unit 25 and a power supply (not shown). The control unit 25 contains a nonvolatile memory 27 and is connected to an input/output unit 26.

The mobile test subset 21 consists essentially of one of the mobile subscriber sets 28 (mobile transceiver station) normally used in the network with its habitual antenna 22; however, it incorporates an additional test interface 29 which permits operation of the set via the control unit 25. The test interface 29 enables call identification parameters and call connection parameters, which are in any case present in the mobile subscriber set, to be acquired and stored in the nonvolatile memory 27 of the control unit 25 together with additional data. Such parameters will include, for example, the subscriber number, identification code, call signals, fault reports (interrupts, abnormal terminations), field strength, frequency (handover), predetermined time etc. An input/output unit 26 is connected to the control unit 25 via which the test subset 21 can be operated and interrogated (establish and terminate connection standby status, dial, request and display status reports etc.). In a preferred design, the input/output unit 26 only comprises a switch for the power supply, a pilot light to indicate the standby status and a reading and recording device for electronic memory cards. In this case, the nonvolatile memory 27 consists of the inserted memory card which contains the call initiation program and also stores the acquired data. Where the test data and call program are transmitted by radio, the mobile subscriber set 28 itself serves as an input/output unit. The test mobile remote unit 16 may contain more than one mobile test subset 21, or a universal mobile test subset, if it is to be usable for different types of mobile radio systems, for example Natel C and Natel D in Switzerland.

The navigation unit 23 enables the geographical position and the exact clock time to be known constantly. The most appropriate means for this purpose at present is a receiver station with a corresponding antenna 24 for the GPS (global positioning system). The GPS is a global position finding system based on a plurality of satellites; it can be accessed worldwide round the clock. It enables the coordinates of a position to be displayed to an accuracy of within 100 m extremely quickly. If a more precise determination is necessary, this can be obtained by means of a second receiver at a permanent and precisely known location using a differential technique. Receivers of this kind are about half a cubic decimeter in size and the accompanying antenna is no larger than this. To obtain usable position data even in the temporary absence of a satellite connection, inertial sensors (gyrator, compass, accelerometer) together with the requisite evaluation circuitry and an altimeter may be added to the GPS receiver. The person skilled in the arm may also use other suitable measures to determine the position and time.

The control unit 25 ensures the performance of a test program. This includes the automatic call to one of the test control units 17 or another test mobile remote unit 16 and the simultaneous gathering of data from the navigation unit 23 and the mobile test subset 21, the storage of bodies of related data in a nonvolatile memory 27, the outputting of status reports etc. A suitably programmed notebook computer can for example be used as the control-unit 25 combined with the input/output unit 26. However, the preferred solution consists of only using the requisite assemblies of the notebook computer, namely the processor card and interface cards, in conjunction with the input/output unit 26 which was described above. The control unit 25 and the input/output unit 26 will then only require a space of less than 1 cubic decimeter.

The power supply consists essentially of a rechargeable battery. It must ensure uninterrupted operation even if the energy source to which the test mobile remote unit is otherwise connected, temporarily drops (e.g. on starting the engine) or is unavailable (separation, field use without a vehicle).

Test mobile remote units 16 of the type described here, possibly with the exception of the addition of inertial sensors to the GPS receiver, can be designed as portable attaché cases. An attaché case of this kind can easily be placed in a test vehicle and brought into immediate service. However, it can advantageously be connected by means of a simple plug to an external radio antenna mounted on the vehicle and also to the vehicle battery. During the test drives, the test mobile remote unit 16 does not require the presence of an operator. The control unit 25 processes the entire call traffic automatically.

Figure 3:
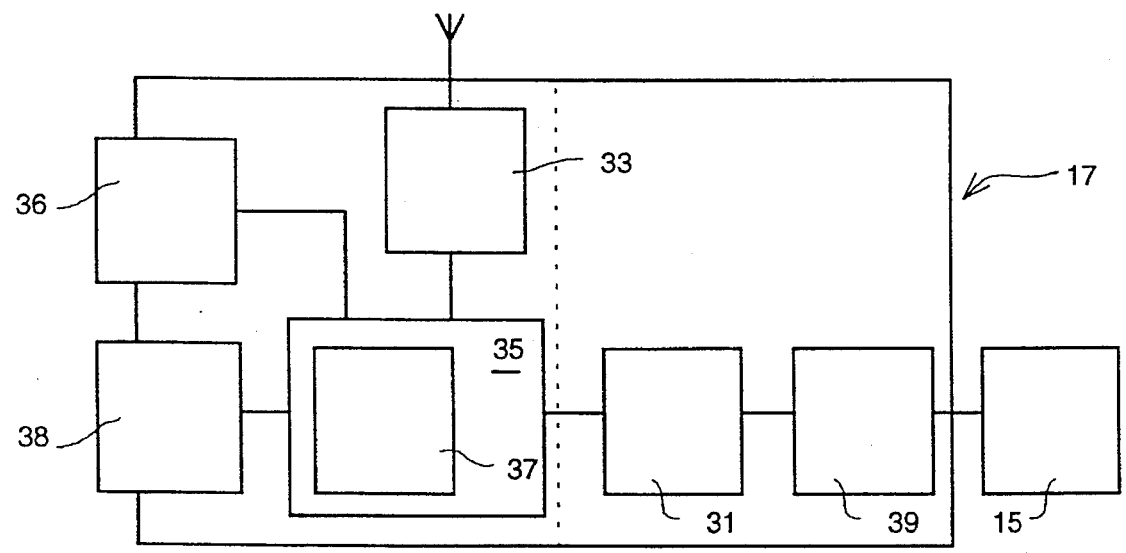

The test control unit 17 will normally be installed in a mobile switching centre 15, but can also be operated via an ordinary telephone connection and is therefore completely autonomous. FIG. 3 shows the functional blocks of the unit and their interaction. It consists essentially of a test computer 35 which controls a programmable call initiating and receiving unit 31; the latter is connected via a line interface 39 to the mobile switching centre 15 and receives at least the exact clock time via its receiving unit 33. The line interface 39 preferably is a printed circuit board in the rack of the call initiating and receiving unit 31, adapted to the actual connection. As already mentioned, the test control unit 17 may not only be connected directly to the mobile switching centre 15 but may also have access over a telephone line to this centre or via the other network 18. The line interface 39 is accordingly designed or there are several different printed circuit boards available from which one at the time is set into operation. In an extended version, the receiving unit 33 consists of a GPS receiver of the type used for the test mobile remote units. By means of accurate prior determination of the position of the unit, the accuracy of the position fixing data of the test mobile remote units can be increased using a differential technique. The test computer 35, a unit having the size of a workstation computer, includes an input unit 36—normally in the shape of a keyboard and data reading unit—and an output unit 38, generally a monitor and a printer. The test computer 35 is capable of initiating calls but for the most part it receives the preprogrammed calls from the test mobile remote units 16 and stores bodies of related data. It evaluates its own data together with those originating from the test mobile remote units 16 and outputs that data. For this purpose, it has a registering module 37 in which the call identification parameters for the calls which are made and the data received from the test mobile remote units 16, i.e. their call identification and connection parameters, are stored with the relevant association between them and are available for evaluation. The result of the evaluation may be printed out in either chart or tabular form. The operator is then able to adjust the call programming on the basis of the results via the input unit 36. However, the computer can also be used in such a way that this step takes place automatically on a preprogrammed basis. For example, if the computer ascertains that the number of calls from a particular area is still too small to enable reliable statistical information to be obtained, it may make arrangements for all the test mobile remote units 16 which drive through this area to make at least one call from this area on their next test run. Or if it finds that at certain times of day the measured values differ excessively, perhaps because of increased loading on the installation, it may arrange for the call density as a function of time to be substantially increased at this time of day on the next test run. Or if it finds on the basis of the calls which it has itself initiated to the mobile test stations that some of them are not operational, it may establish more frequent connections with the others. This adaptation of the call predetermination enables optimum use to be made of the test facility. The programmable call initiating and receiving unit 31 and the line interface 39 will not necessarily be located in the same place as the test computer 35.

A typical, but not the only possible, test sequence will take place as follows. Using the input unit 36 and the output unit 38, the operator inputs the data for a test-run on a menu-driven basis to the test computer 35. When doing so, he determines the number of participating test units and their call identification, the duration of the test and the times of day, e.g. in the first half of May, every day from 8 am to 8 pm, the frequency and duration of the calls, e.g. for one minute at ten minute intervals, including the time needed to establish the connection, and the maximum time allowed for a connection to be established, e.g. 20 seconds. Different parameters may also be specified for the different test mobile remote units 16. A memory card is now written for each of the defined test mobile remote units 16; the card is inserted in the test mobile remote unit 16 and the latter is brought into service on the specified vehicle. The data on the control card ensure automatic running of the call initiation program in the control unit 25 of the test mobile remote unit 16. The distant station is the test control unit 17 whose call initiating and receiving unit 31 is capable of handling up to thirty calls simultaneously. For each call which is initiated by the control unit 25 via the mobile test subset 21, both the call identification and connection parameters mentioned above and also the position and time data are recorded and written on the memory card. When the test is over, the memory cards are read into the test computer 35 from the test mobile remote units. The test computer stores the data in a data bank from which further evaluation is then made.

The unsupervised data acquisition with the aid of relatively simple and low cost test units enables a large number of random samples to be taken while the installation is in operation, so permitting significant statistical evaluation. In an extended version of the method, the result of the statistical evaluation is used to adjust the call initiation program as already indicated with examples. This adjustment is particularly efficient if the data exchange between the test mobile remote unit 16 and the test control unit 17 also takes place via the test calls, so enabling the call initiation program to be adapted while the test is in progress.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

List of Reference Signs

11 Cell
12 Base antenna
13 Base transceiver unit (BTS)
14 Base station control (BSC)
15 Mobile switching centre (MSC)
16 Test mobile remote unit
17 Test control unit (TCU)
18 Other network (PSTN, ISDN)
19 Established connection
20 Route
21 Mobile test subset
22 Antenna (for the mobile test subset)
23 Navigation unit
24 Antenna for the GPS
25 Control unit
26 Input/output unit
27 Nonvolatile memory
28 Mobile subscriber set
29 Test interface
30
31 Call initiating and receiving unit
32
33 Receiving unit
34
35 Test computer
36 Input unit
37 Registering module
38 Output unit
39 Line interface

We claim:

1. Method to ascertain the quality of service in a mobile radio installation with at least one base transceiver station and a plurality of mobile subscriber sets, comprising the steps of:

storing programmed instructions for initiating calls in at least one test mobile remote unit having means for measuring position and clock time data;

initiating calls between said at least one test mobile remote unit (16) at selected time or position intervals and a test control unit (17) or between plural test mobile remote units (16) controlled by said programmed instructions, storing call identification and call connection parameters as well as position and clock time data in both the test mobile remote unit and the test Control unit, and transferring the stored data in the at least one test mobile remote unit to the test control unit (17) for statistical evaluation and display;

and wherein said step of initiating calls between said at least one test mobile remote unit and the test control unit includes at least one call initiated on the basis of a measured position as compared to at least one preselected position stored within the test mobile remote unit (16).

2. Method according to claim 1, further comprising the step of changing the at least one preselected position stored within the test mobile remote unit based on a preceding step of statistical evaluation in the test control unit.

3. Apparatus for determining quality of service in a mobile radio installation having a mobile switching center (15), at least one base transceiver station and a plurality of mobile subscriber sets, comprising:

at least one test mobile remote unit (16) having a mobile test subset (21) having a mobile subscriber set (28) together with a test interface (29) for retransmission of call identification and connection parameters and a navigation unit (23), both of which are connected to a control unit (25) which contains a nonvolatile memory (27) and is connected to an input/output unit (26); and at least one test control unit (17), having a programmable call initiating and receiving unit (31) to which a line interface (39) is connected to permit connection to the mobile switching center (15) and having a receiving unit (33) for receiving at least a radio time standard, and having an input unit (36) and an output unit (38), all connected to a test computer (35) which comprises a registering module (37) for storage of call identification parameters and for storage of data transferred from the test mobile remote unit (16) to the test control unit (17).

4. Device according to claim 3, whereby the line interface (39) is for connection to the mobile switching center (15) for allowing an access directly or over a telephone line or via another network (18).

5. Device according to claim 3, whereby the navigation unit (23) comprises a receiving unit for a global satellite positioning system.

6. Device according to claim 3, whereby the receiving unit (33) of the test control unit (17) is a receiving unit for a global satellite positioning system.

7. Device according to claim 12, whereby the test mobile remote unit (16) is designed as a portable attaché case.

8. Method to ascertain the quality of service in a mobile radio installation with at least one base transceiver station and a plurality of mobile subscriber sets, comprising the steps of:

storing programmed instructions for initiating calls in at least one test mobile remote unit having means for measuring position and clock time data;

initiating calls between said at least one test mobile remote unit (16) at selected time or position intervals and a test control unit (17) or between plural test mobile remote units (16) controlled by said programmed instructions, storing call identification and call connection parameters as well as position and clock time data in both the test mobile remote unit and the test control unit, and transferring the stored data in the at least one test mobile remote unit to the test control unit (17) for statistical evaluation and display;

and wherein said programmed instructions are transmitted to said at least one test mobile remote unit from said test control unit by radio.

9. Method of claim 2, wherein said programmed instructions are transmitted to said at least one test mobile remote unit from said test control unit by radio.

10. Method to ascertain the quality of service in a mobile radio installation with at least one base transceiver station and a plurality of mobile subscriber sets, comprising the steps of:

storing programmed instructions for initiating calls in at least one test mobile remote unit having means for measuring position and clock time data;

initiating calls between said at least one test mobile remote unit (16) at selected time or position intervals and a test control unit (17) or between plural test mobile remote units (16) controlled by said programmed instructions, storing call identification and call connection parameters as well as position and clock time data in both the test mobile remote unit and the test control unit, and transferring the stored data in the at least one test mobile remote unit to the test control unit (17) for statistical evaluation and display;

and wherein said step of storing programmed instructions for initiating calls is preceded by a step of transmitting by radio said programmed instructions from said test control unit to said at least one test mobile remote unit.

11. Method of claim 10, wherein said step of transmitting by radio is preceded by a step of statistical evaluation.

12. Method to ascertain the quality of service in a mobile radio installation with at least one base transceiver station and a plurality of mobile subscriber sets, comprising the steps of:

storing programmed instructions for initiating calls in at least one test mobile remote unit having means for measuring position and clock time data;

initiating calls between said at least one test mobile remote unit (16) at selected time or position intervals and a test control unit (17) or between plural test mobile remote units (16) controlled by said programmed instructions, storing call identification and call connection parameters as well as position and clock time data in both the test mobile remote unit and the test control unit, and transferring the stored data in the at least one test mobile remote unit to the test control unit (17) for statistical evaluation and display;

wherein the step of transferring the stored data in the at least one test mobile remote unit (16) takes place by radio, and wherein the result of the statistical evaluation is for changing the programmed instructions for initiating calls.

13. Method according to claim 12, further comprising the step of:

setting up the plural test mobile remote units (16) on vehicles for circulating mainly on arbitrary routes (20) wherein said selected time or position intervals are selected at regular time or position intervals.

14. Method according to claim 12, further comprising the step of:

setting up the plural test mobile remote units (16) on a corresponding plurality of vehicles, for circulating in particular territories in such a way that they are substantially equally distributed and cover an entire area.

15. Method according to claim 12, wherein said step of transferring further comprises the step of transferring the call identification and call connection parameters of calls initiated by the test mobile remote unit (16), in addition to calls initiated by the test control unit for said statistical evaluation and display.

16. Method according to claim 12, applied to a cellular mobile radio system, whereby parameters specific to cellular mobile radio, in particular an identification of a base station and any intercellular handover which occurs are also stored in said step of storing.

17. Method according to claim 1, further comprising the step of:

setting up the plural test mobile remote units (16) on vehicles for circulating mainly on arbitrary routes (20) wherein said selected time or position intervals are selected at regular time or position intervals.

18. Method according to claim 1, further comprising the step of:

setting up the plural test mobile remote units (16) on a corresponding plurality of vehicles, for circulating in particular territories in such a way that they are substantially equally distributed and cover an entire area.

19. Method according to claim 1, wherein said step of transferring further comprises the step of transferring the call identification and call connection parameters of calls initiated by the test mobile remote unit (16), in addition to calls initiated by the test control unit for said statistical evaluation and display.

20. Method according to claim 1, applied to a cellular mobile radio system, whereby parameters specific to cellular mobile radio, in particular an identification of a base station and any intercellular handover which occurs are also stored in said step of storing.

21. Method according to claim 8, further comprising the step of:

setting up the plural test mobile remote units (16) on vehicles for circulating mainly on arbitrary routes (20) wherein said selected time or position intervals are selected at regular time or position intervals.

22. Method according to claim 8, further comprising the step of:

setting up the plural test mobile remote units (16) on a corresponding plurality of vehicles, for circulating in particular territories in such a way that they are substantially equally distributed and cover an entire area.

23. Method according to claim 8, wherein said step of transferring further comprises the step of transferring the call identification and call connection parameters of calls initiated by the test mobile remote unit (16), in addition to calls initiated by the test control unit for said statistical evaluation and display.

24. Method according to claim 8, applied to a cellular mobile radio system, whereby parameters specific to cellular mobile radio, in particular an identification of a base station and any intercellular handover which occurs are also stored in said step of storing.

25. Method according to claim 10, further comprising the step of:

setting up the plural test mobile remote units (16) on vehicles for circulating mainly on arbitrary routes (20) wherein said selected time or position intervals are selected at regular time or position intervals.

26. Method according to claim 10, further comprising the step of:

setting up the plural test mobile remote units (16) on a corresponding plurality of vehicles, for circulating in particular territories in such a way that they are substantially equally distributed and cover an entire area.

27. Method according to claim 10, wherein said step of transferring further comprises the step of transferring the call identification and call connection parameters of calls initiated by the test mobile remote unit (16), in addition to calls initiated by the test control unit for said statistical evaluation and display.

28. Method according to claim 10, applied to a cellular mobile radio system, whereby parameters specific to cellular mobile radio, in particular an identification of a base station and any intercellular handover which occurs are also stored in said step of storing.

* * * * *